Aug. 25, 1953  J. W. LARSON ET AL  2,650,185
METHOD OF BONDING FAYING SURFACES OF METALLIC MEMBERS
Filed May 18, 1950
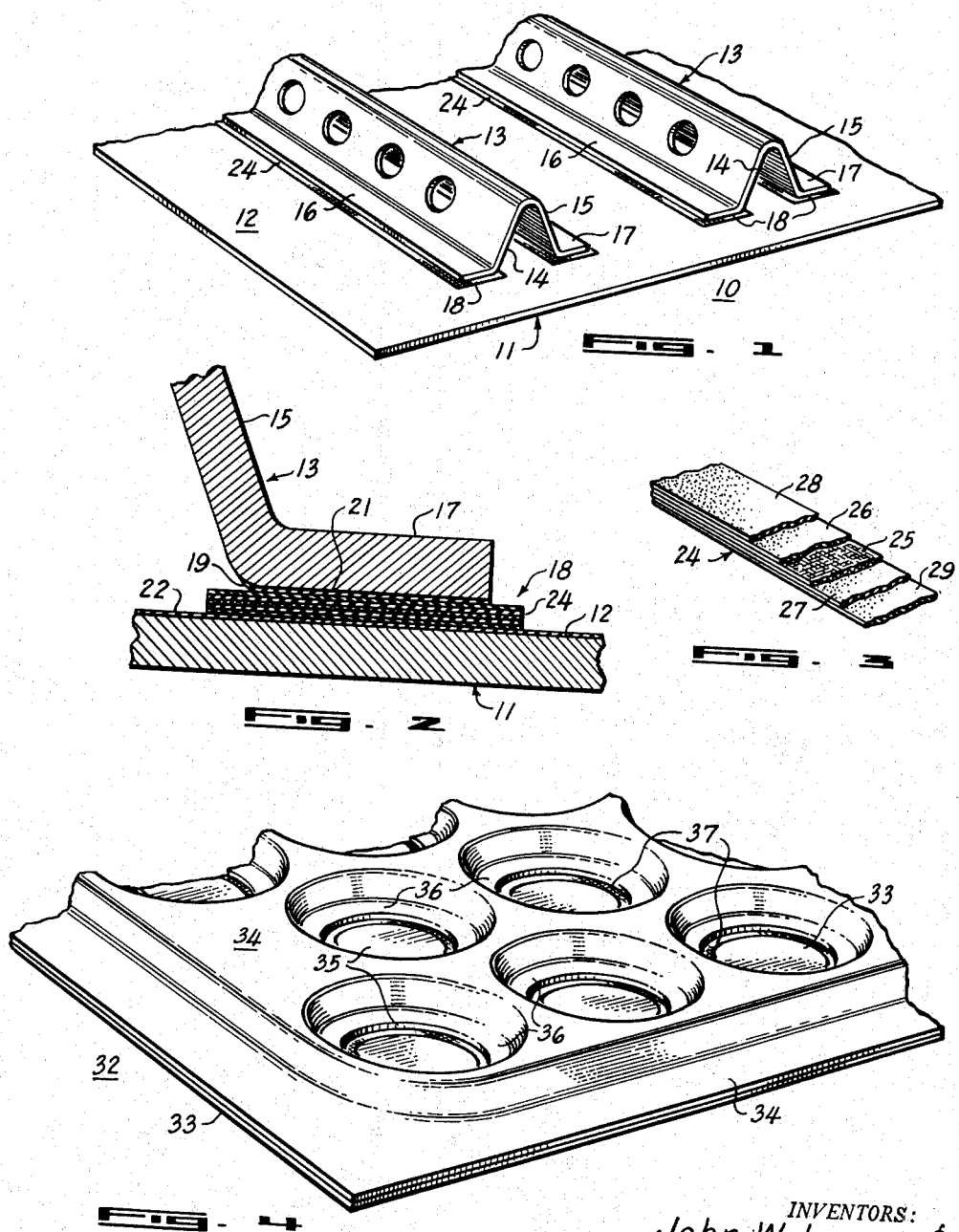
INVENTORS:
John W. Larson &
BY Douglas A. Tooley
ATTORNEY Patented Aug. 25, 1953

2,650,185

UNITED STATES PATENT OFFICE 2,650,185

METHOD OF BONDING FAYING SURFACES OF METALLIC MEMBERS

John W. Larson and Douglas A. Tooley, Fort Worth, Tex., assignors to Consolidated Vultee Aircraft Corporation, San Diego, Calif., a corporation of Delaware Application May 18, 1950, Serial No. 162,698

4 Claims. (Cl. 154—129)

This invention relates to uniting metallic parts, and more particularly to a method of bonding metal to metal and utilizing pressure-heat sensitive bonding materials.

An object of the present invention is to provide a method of fabricating metallic structural members wherein the parts are joined together without welding or riveting to avoid the surface blemishes inherent in such operations while attaining joint strengths greater than are provided by such attaching methods.

Another object of this invention lies in the provision of a method for joining metals having particularly low fatigue resistance so that the resultant structure has high strength and excellent fatigue characteristics.

Another object of the invention is to provide an improved method of manufacturing structural panels whereby thin metal sheet material may be utilized.

A further object of the invention resides in a method of adhering metal to metal by the use of a pre-formed adhesive tape, which tape comprises laminae of different thermosetting adhesive compositions, to form a bond capable of withstanding severe stresses.

A still further object of the invention is to provide a novel method of producing an improved joint between two metallic parts, which method is relatively simple, comparatively cheap, and is readily adaptable to production use.

Other objects and features of the present invention will be readily apparent to those skilled in the art from the following specification and appended drawing wherein is illustrated a preferred form of the invention, and in which:

Figure 1 is an elevational perspective view of one type of structural member made in accordance with this invention.

Figure 2 is a fragmentary sectional view showing the construction of the joint effected by this invention.

Figure 3 is a diagrammatic view of the tape utilized in the invention showing the components thereof; and Figure 4 is an elevational perspective view of another type of structural member made by the method of the present invention.

The present invention contemplates the manufacture of structural members adapted for use in airplanes, vehicles, railroad cars, and wherever it is desired to join members together to effect a structural item having high strength and high resistance to fatigue failure. The structural members may be constituted of metallic parts of various shapes, sizes and thicknesses, with the metal constituting the parts being ferrous or non-ferrous.

The invention is particularly adapted to the making of structural members for use in aircraft where lightness of weight with high strength is the desideratum. In this field of manufacture the metals found to have the desired characteristic of strength with lightness of weight are the alloys of aluminum and magnesium, and consequently such alloys constitute a very large percentage of the material embodied in the modern airplane. Various structural parts, such as wings, fuselage, panels, doors, control surfaces, etc. are readily formed of either one or the other of these metals, or of a combination of both. Such parts, usually involve in their construction, a sheet or plate element to which are fastened strengthening or reinforcing members; these latter members may assume various shapes and are usually suitably formed from sheet material as by stamping, pressing or drawing, or may be formed by any other well-known manufacturing method. The amount of reinforcement provided is dependent on the use to which a particular structural member is put and the loads and stresses it will encounter. Because weight is an important consideration obviously only as many strengthening members as will provide the needed strength will be utilized. The aluminum alloy employed in aircraft manufacture is usually in the form known as "Alclad" sheet. The word, "Alclad," is a trade-mark of the Aluminum Company of America and is the designation applied to material having an aluminum alloy core or base covered on each side with a coating of relatively high-purity aluminum which is highly resistant to corrosion. This coating also affords electrolytic protection. Parts made of magnesium-base alloys also require treatment to protect them against atmospheric and electrolytic corrosion. Corrosion resistant coatings may be effected either chemically or electrolytically, by any well-known method. In the operation of the present invention it is preferred that the magnesium-alloy part be provided with a corrosion-resistant finish by an anodic treatment. A particularly effective electro-chemical coating process is that which is described in U. S. Letters Patent 2,497,036, the electrolytic treatment detailed therein being ideally adapted for mass or commercial treatment of magnesium parts. If desired, added protection could be provided by applying an organic coating to the anodized parts.

Referring now with particularity to the drawing, and first to Figure 1, there is illustrated a structural panel 10, which, it is understood, is merely representative of a composite metal article constructed in accordance with the method of the present invention. Structural panel 10 comprises a relatively thin, metallic sheet member or plate 11 to one face 12 of which are applied a plurality of generally V-shaped metallic stiffener elements 13; which stiffener elements 13 comprise leg members 14 and 15, with outwardly directed flanges 16 and 17 provided at the outer ends of these leg members. The stiffeners 13 are fixedly secured to the sheet 11 at the flanges 16 and 17 by the joints 18. Joints 18, having the desired strength and fatigue characteristics, are obtained by applying an adhesive coating 19 to the outer face 21 of each of the flanges 16 and 17 and a coating 22 of a similar adhesive to the face 12 of the sheet member 11, and disposing between each coated flange and the coated face 12 a strip of tape 24 formed of laminae of heat and pressure sensitive bonding adhesives.

The sheet member 11 and the stiffener elements 13, since the structural panel 10 is assumed to be intended primarily for aircraft manufacture, are preferably formed either of a clad aluminum alloy or of a magnesium-base alloy. However, one of the parts could be clad aluminum alloy and the other part made of magnesium-base alloy. Where the part is made of magnesium-base alloy it has been suitably electrolytically treated to provide it with a corrosion resistant coating.

In securing two metallic members together, as by a joint 18, it is desirable that the two metal parts have the faying surfaces of the same general contour whereby they can be readily mated to include an adhesive tape strip of film 24 therebetween. For best adherence and the strongest bonds it is preferred that flat faying surfaces be provided on the parts to be joined so that there is a fairly substantial area of contact therebetween when the parts are placed together.

The adhesive film or tape 24 utilized in the method of the present invention is one which is characterized by its high elasticity and effectiveness in damping vibration. This invention is not concerned with the specific composition of such a tape or film but contemplates the use of those tapes which are formed of adhesive compositions adapted to adhere to metal when cured under suitable heat and pressure conditions.

A preferred form of tape is described in a copending application, Serial No. 150,882, filed March 21, 1950. The particular tape or film there set forth is illustrated by Figure 3 and is indicated generally by the numeral 24. Tape 24, as shown, comprises a flexible base or core 25 formed of woven material, such as fibrous glass cloth or nylon cloth. This base is coated with two types of thermosetting adhesive compositions, which adhesives are applied from solution in any suitable manner, as by brushing, dipping, roller coating and spraying. A low pressure-heat sensitive thermosetting adhesive composition is applied first to the fibrous base 25 to effect the inner laminae 26 and 27. A preferred low pressure adhesive is one which comprises or consists of a synthetic linear polyamide combined with a compatible phenol formaldehyde resin combined in a common solvent, such as ethyl alcohol. As set forth in the above mentioned co-pending application, the polyamides that may be used are of the alcohol soluble type described in United States Patent 2,130,948. Alcohol soluble polyamides are those which are prepared from diamines and dicarboxylic acids, one or both of which contain a hydrocarbon substituent in the chain of atoms separating the amide-forming groups. As an example there is the polyamide derived from hexamethylene diamine and beta-methyl adipic acid. Polymers derived from a mixture of polyamide-forming reactants afford another class of polyamides. An example of such an interpolymer or copolymer is the polyamide derived from a mixture of diamines with one or more dicarboxylic acids. Thus the interpolyamide derived from equimolecular amounts of hexamethylene diammonium sebacate is contemplated for use. The phenol-formaldehyde resin employed is alcohol soluble and in the A-stage. Preferably the resin is a condensation product condensed in the molecular ratio of from 1 mol of phenol to 3 mols formaldehyde made either with an acid or basic catalyst and neutralized in a manner well known in the art. The quantity of synthetic linear polyamide in the adhesive composition may range from 33⅓% to 80% by weight. For satisfactory composition, the amount of solids content in the common alcohol solvent may range from 15% to 55% by weight. After the first coating has been applied the assembly is subjected to a drying operation to drive off the solvent. The tape is then coated, in a usual manner, with a high pressure-heat sensitive thermosetting adhesive composition to form the outer laminae 28 and 29. The initial adhesive coating penetrates into the interstices between the fibers of the base and bridges thereover to provide a foundation to which the second adhesive coating adheres. The high pressure thermosetting adhesive composition preferably comprises a synthetic rubber combined with a compatible phenol formaldehyde synthetic resin in a suitable solvent, such as toluene. A very satisfactory common solvent has been found to be one consisting of 60% toluene and 40% cyclohexanone. The preferred synthetic rubber is neoprene. A plastic polymer of chloroprene. This polymer may be prepared by polymerizing chloroprene as set out in U. S. Patent 1,950,436. Chloroprene is chloro-2-butadiene-1:3. Other synthetic rubber compounds, such as the butadiene acrylic nitrile type rubbers, known commercially as "Chemigum" and "Hycar," may be employed. The phenol-formaldehyde resin employed is, as in the low pressure adhesive, preferably an A-stage alcohol soluble phenol formaldehyde condensation product condensed in the molecular ratio of from 1 mol of phenol to .7 to 3 mols formaldehyde made either with an acid or basic catalyst and neutralized in well known manner. The proportions of the constituents comprising the high pressure thermosetting adhesive composition may vary from, by weight, 20 to 50 parts of A-stage phenol formaldehyde resin to 100 parts of the synthetic rubber compound. After the addition of the high pressure thermosetting adhesive coating the tape is again subjected to a drying treatment to evaporate the solvent therefrom. With the evaporation of this solvent the tape is ready for use.

A tape having the composition above described has been found to be particularly effective in damping vibrations and to result in a construction that is highly fatigue resistant. The synthetic rubber component of the outer adhesive laminae provides elasticity to the bond and the desired vibration damping characteristic. The phenolic resin in the adhesive serves to adhere the synthetic rubber to the surfaces to be joined, and additionally increases the capacity of the synthetic rubber to absorb vibration. The phenolic resin modified synthetic linear polyamide adhesive is utilized to permit the use of lower curing pressures. It has the ability, when subjected to heat, to flow readily under the application of relatively low pressures and will avoid stress concentrations.

The tape 24 is comparatively thin, having a thickness which ranges between .013″ and .024″. The fibrous base 25 preferably should be no more than .004″ thick, while the inner laminae 26 and 27 may range between .0025″ to .005″, and the outer laminae 28 and 29 may have a thickness of between .002″ and .005″.

Tape 24 is easily handled and can readily be cut into proper lengths and widths as required by the dimensions of the assembly with which it is to be employed. It affords a simplified and rapid device for joining together the parts of an assembly.

Satisfactory bonds could be secured between faying surfaces of parts to be joined with the use of tape 24 alone, but most satisfactory and highly effective joints are found to result when the faying surfaces are first coated with an adhesive prior to the insertion of the tape. Therefore in the preferred form of the invention the faying surfaces will be coated. The adhesive applied to the faying surfaces is, preferably, the same as the adhesive which comprises the outer laminae 28 and 29 of the tape 24. This adhesive, as stated hereinbefore, is a high pressure-heat sensitive thermosetting composition comprised of a synthetic rubber combined with a compatible phenol-formaldehyde resin in a common solvent. The adhesive is applied to the faying surfaces in any suitable manner, as by spraying, and then permitted to dry before the tape 24 is provided between these surfaces. Before the faying surfaces are coated they are thoroughly cleaned to insure that the adhesive will adhere satisfactorily.

After the faying surfaces have been prepared for bonding and the adhesive tape located in place the assembly is then subjected to heat and pressure to effect curing of the thermosetting resins.

The assembled detail parts are placed on a suitable curing fixture and the assembly is then covered by a rubber blanket which is fixed to the fixture and a partial vacuum is then applied under the rubber blanket to effect the necessary pressure required for curing. The specific construction of the curing fixture and the details of the vacuum equipment necessary to develop the pressure required forms no part of the present invention. The invention contemplates the use of any suitable fixture for holding the detail parts and does not limit itself to any particular method or means for obtaining the required pressure. Suitable mechanical pressure means are of course to be considered within the purview of this invention.

The fixture and the assembly are next transferred to a heated curing oven, or any suitable heating fixture, and the cure effected and the bond secured.

To further explain the method of the present invention, the procedure whereby the structural panel 10 is constructed will be described in detail and with completeness. It is assumed that the sheet member 11 and the V-shaped stiffener elements 13 comprising the panel 10 are made of clad aluminum.

Those surfaces of the sheet 11 and the stiffener elements 13 which are to be bonded are first thoroughly cleaned. This entails removal of all of the marking and identification lacquers, oils, greases and other foreign substances. A suitable solvent-cleaner is employed. The solvent-cleaner may be of any effective known composition. A useful solvent-cleaner has been found to be one made of a mixture of straight hydrocarbons of low molecular weight, such as a mixture of soluble ethyl acetate, soluble acetone, and low-flash naptha. After the surfaces have been treated with a solvent-cleaner they are put through a degreasing operation in a vapor degreaser using stabilized trichlorethylene to insure removal of all non-volatile matter. The next step in the cleaning process is a wiping of the areas to be bonded with a clean starch-free cheesecloth, or other fibrous cloth, preferably of lint-free cotton to remove fingerprints, dust, etc.

The parts to be bonded together are then provided, as by spraying or brushing, with a coating of a thermosetting adhesive which, preferably, is of the same composition as the high pressure-heat sensitive thermosetting adhesive utilized in the formation of the outer laminae 28 and 29 of tape 24. As described hereinabove this composition which composes laminae 28 and 29 preferably comprises a synthetic rubber combined with a phenol-formaldehyde synthetic resin. The synthetic rubber and phenol-formaldehyde are in solution in a solvent comprising 60% toluene and 40% cyclohexane and in sufficient quantity to effect the desired consistency. The consistency should be such as will permit the adhesive to be readily applied to the surfaces to be joined. The coating is then air dried for 40-45 minutes, which is optimum drying time. The drying period could range from a minimum of 20 minutes to a maximum of 8 hours. The thickness of the dried coating should preferably be between .00075″ to .0015″.

After the coating has been formed on the required areas a nylon base tape is laid on one surface and the other surface assembled on the tape. The tape is of sufficient length that the whole of the contacting areas are covered. Suitable devices, such as toggle clomps, are in assembled position on a locating jig. A rubber blanket is then fixed to the locating jig and sealed at its edges. The parts are now ready for the curing operation and this operation must be carried out within 72 hours, otherwise the adhesive material may be fouled with dust or other soil, or dried excessively.

Heat and pressure must now be provided to accomplish the required bonding. A vacuum pressure is therefore developed under the rubber blanket. This pressure may vary from 7½ to 100 p. s. i. With the pressure being applied the locating jig is then transferred to a heating oven. The assembly is now maintained in the oven for a period of 25 to 35 minutes and at a temperature of 320° to 350° F. This heat and pressure treatment results in the thermosetting resinous coatings and tape being effectively cured and converted to their finally hardened infusible state.

Upon completion of the curing the structural panel is taken from the oven and removed from the locating jig; it is now ready to be used.

The construction of a structural unit whose elements are made of clad aluminum has been described, the treatment involved in the fabricating of a composite article made of magnesium base alloys will now be detailed.

Figure 4 illustrates a structural panel 32 comprising a sheet 33 and a stiffener plate 34 having a plurality of lightening holes 35 therein, each hole having an inwardly directed annular flange 36 formed around the hole. The plate 34 may be fabricated in conventional manner with well known forming tools, such as a drop-hammer or a hydraulic ram, and an appropriate die. Stiffener plate 34 is to be bonded to flat plate 33 at the flanges 36. The joints 37 effected between flanges 36 and flat plate 33 are the same as joints 18 which connect the flanges of V-shaped stiffener elements 13 to its associated plate 11 in structural panel 10. Joints 37 therefore are made up of an adhesive coating applied to each of the faying surfaces and a tape similar to tape 24 interposed between these coatings. Since flanges 36 are annular the tape is cut to a conforming shape, either in a single place or in a series of arcuate sections which form a circle.

Since it is assumed that the sheet 33 and the stiffener plate 34 of structural panel 32 are made of magnesium-base alloy the bonding operation will be as follows:

The parts are first subjected to an electrolytic treatment to form a corrosion-resistant coating thereon. This coating may readily be obtained by the use of the electro-chemical process described in U. S. Patent 2,497,036. After anodizing the parts are dried and any anodic powder present on the surfaces is removed with a clean, lint and starch free cloth.

Following this the parts are dipped in a zinc chromate primer and then dried at 155° to 175° F. for 20 to 30 minutes or dried at room temperature for at least 24 hours. The thickness of the prime coat should be between .0002 to .00035 inch.

This anodizing and priming treatment is required when magnesium parts are employed because if good surface protection is not available a high strength bond cannot be obtained.

As in the case of the joining of alclad aluminum parts the surfaces of the magnesium parts to be bonded must be absolutely clean. The areas to be bonded therefore are sponged with an appropriate solvent to remove foreign matter that may be present. Aliphatic naphtha has been found to be an effective cleaner. The parts are then wiped dry with a clean, lint and starch free cloth.

The treatment hereafter to effect bonding of flanges 36 to the plate 33 is generally the same as is required to bond stiffener elements 13 to plate 11. As described above, a coating of the phenolic resin modified synthetic rubber composition is sprayed onto the undersurface of flanges 36 and upon the upper face of the plate 33. After the coating has been applied it is air dried for 40–45 minutes.

Thereafter nylon base laminated tape is laid between the faying surfaces being joined, and the assembly is suitably clamped together in a locating jig. Vacuum pressure is employed here also so a rubber blanket is provided on the locating jig and is properly sealed. The next step is the curing operation, and, as in the case of clad aluminum, it must be performed within 72 hours to insure that the tape is in proper condition.

The pressure range for bonding together magnesium parts is similar to that used in bonding clad aluminum. This range of 7.5 to 100 p. s. i. has been found to provide desirable bonding strengths.

While the parts are being held together under vacuum pressure they are moved to an oven for the application of heat. In the oven the bond is completed after 25 to 35 minutes at a temperature of 320–350° F.

Usually after the curing operation structural members made of magnesium base alloys are given additional paint protection, which normally consists of a second coat of zinc chromate primer to insure resistance to corrosion.

With the method of the present invention parts formed of dissimilar metals are adapted readily to be joined together. For instance a structural panel may be fabricated utilizing clad aluminum for one part and magnesium base alloy for the other. The clad aluminum part would be prepared for bonding in the same manner as the clad aluminum parts of structural panel 10 were prepared. The magnesium base alloy part would be anodized and cleaned as described above. An adhesive coating would be applied to each of the parts and a strip of tape laid between the faying surfaces to be bonded. Pressure would be applied through a suitable agency and the assembly would be subjected to heat to effect the desired polymerization of the thermosetting resins. With joints formed between two dissimilar metals as herein described electrolytic corrosion affords no problem since there is no contact between bare surfaces. Dissimilar metallic materials may readily be employed and without difficulty.

There is thus provided by the present invention a novel method of bonding one member to another at their faying surfaces. The members which are joined become so closely associated that in effect a unitary structural member is formed. This method widens the scope of uses to which magnesium-base alloys may be put. It is extremely difficult to rivet or weld magnesium or its alloys. With this invention it is a simple matter to fabricate structural members made wholly of magnesium alloys, without injury to its appearance or detraction from its strength.

The method of this invention is particularly adapted to production use. The cleaning and preparation of the parts for bonding can be readily carried out even though care must be taken. The use of adhesives in tape form leads to simplification and avoids the troublesome variations which occur when bonding is performed with adhesives applied entirely by brushing, spraying, roller coating or like methods. The curing temperatures and pressures required are easily obtained and relatively simple to maintain within the tolerance limitations permitted.

Structural panels joined together in accordance with this invention are found to have excellent resistance to fatigue occasioned by vibration forces applied to the panel. Further, the joints formed were found to be resistant to normal cleaning compounds which might be encountered in service. Fuels and oils were also found to have little effect on the strength of the bond. The panels present a pleasing appearance since they offer a smooth outer surface unbroken by rivet patterns. Thinner skins may be employed and the weight saved because of this is, obviously, particularly desirable in aircraft manufacturing.

It is to be expressly understood that the invention is not limited to the embodiments thereof illustrated and described. It is readily apparent to those skilled in the art that the method herein described could be readily used for the fabrication of various other structures. The articles that may be caused to adhere may be of any desired shape or form providing they present faying surfaces between which a tape may be included. The drawings and the detailed description, while disclosing the best form of the invention, are understood to serve to explain the principles of the invention and not to limit its scope to specific details except to such extent as specific details are defined in the claims. The invention is to be given its broadest possible interpretation within the terms of the following claims.

What we claim is:

1. A method of joining faying surfaces of metallic members comprising applying on said faying surfaces a high pressure-heat sensitive, thermosetting resin adhesive coating, interposing between the coated faying surfaces a laminated bonding tape comprising a flexible supporting body, inner laminae of a low pressure-heat sensitive, thermosetting resin adhesive adhered to the opposite faces of said supporting body, said adhesive composing the inner laminae comprising the product of 66⅔% to 20% by weight of an alcohol soluble synthetic linear polyamide and 33⅓% to 80% by weight of a compatible phenol formaldehyde resin, and outer laminae of a high pressure-heat sensitive thermosetting resin adhesive adhered to said first adhesive laminae, which latter adhesive is of the same character as that adhesive coating applied to the faying surfaces and comprises the product of a mixture of 100 parts, by weight, of a synthetic rubber selected from the group consisting of chloroprene polymers and butadiene acrylic nitrile copolymers and 20 to 50 parts, by weight, of a compatible phenol formaldehyde resin, and then hardening the various adhesives by the application of heat.

2. A method of bonding faying surfaces of metallic members that comprises cleaning the faying surfaces of all foreign matter, applying a coating on each of said faying surfaces of a heat-hardenable thermosetting resin adhesive, interposing between the coated faying surfaces a laminated bonding tape comprising inner laminae of a heat-hardenable thermosetting resin adhesive comprised of the product of a mixture of 66⅔% to 20% by weight of an alcohol soluble synthetic linear polyamide and 33⅓% to 80% by weight of a compatible phenol formaldehyde resin, and outer laminae of a heat-hardenable thermosetting resin adhesive comprised of the product of a mixture of 20 to 50 parts, by weight, of a phenol formaldehyde resin and 100 parts, by weight of a synthetic rubber selected from the group consisting of a chloroprene polymer and a butadiene acrylic nitrile polymer, applying pressure to the assembly, and then hardening the various adhesives by the application of heat.

3. A method of uniting faying surfaces of metallic members comprising applying coatings on said faying surfaces of a pressure-heat sensitive, thermosetting resin adhesive composition, interposing between the coated faying surfaces a laminated bonding tape having a thickness of between .013″ and .024″ and comprising a flexible body to which are adhered inner laminae of a pressure-heat sensitive, thermosetting resin adhesive composition of one type and outer laminae of a pressure-heat sensitive, thermosetting resin adhesive composition of a different type, and then consolidating the assembly under heat and pressure, said adhesive composing the inner laminae comprising the product of a mixture of 66⅔% to 20% by weight of an alcohol soluble synthetic linear polyamide and 33⅓% to 80% by weight of a compatible phenol formaldehyde resin, and the adhesive composing the outer laminae comprising the product of a mixture of 100 parts, by weight, of a synthetic rubber selected from the group consisting of chloroprene polymers and butadiene acrylic nitrile copolymers and 20 to 50 parts, by weight, of a compatible phenol-formaldehyde resin.

4. A method of uniting faying surfaces of metallic members comprising applying coatings on said faying surfaces of a pressure-heat sensitive, thermosetting resin adhesive composition, interposing between the coated faying surfaces a laminated bonding tape having a thickness of between .013″ and .024″ and comprising a flexible body to which are adhered inner laminae of a pressure-heat sensitive, thermosetting resin adhesive comprised of the product of a mixture of 66⅔% to 20%, by weight, of an alcohol soluble synthetic linear polyamide and 33⅓% to 80%, by weight, of a compatible phenol formaldehyde resin, and outer laminae of a pressure-heat sensitive, thermosetting adhesive composition comprised of the product of a mixture of 100 parts, by weight, of a synthetic rubber selected from the group consisting of chloroprene polymers and butadiene acrylic nitrile copolymers; and 20 to 50 parts, by weight, of a compatible phenol-formaldehyde resin, the character of the adhesive composition forming the coatings applied to the faying surfaces being the same as the adhesive composition forming said outer laminae, and then consolidating the assembly by applying pressure of from 7.5 to 100 pounds per square inch thereon and maintaining the assembly at a temperature of 320° to 350° F. for a period of 25 to 35 minutes.

JOHN W. LARSON.
DOUGLAS A. TOOLEY.

References Cited in the file of this patent

UNITED STATES PATENTS

| Number | Name | Date |
|---|---|---|
| 2,208,619 | Armor et al. | July 23, 1940 |
| 2,304,718 | Swart | Dec. 8, 1942 |
| 2,322,779 | Gocher et al. | June 29, 1943 |
| 2,376,854 | Saunders et al. | May 22, 1945 |
| 2,399,184 | Heckert | Apr. 30, 1946 |
| 2,405,038 | Jennings | July 30, 1946 |
| 2,414,125 | Rheinfrank | Jan. 14, 1947 |
| 2,415,881 | Heftler | Feb. 18, 1947 |
| 2,479,342 | Gibbons et al. | Aug. 16, 1949 |

OTHER REFERENCES

"Cycleweld" article published in "American Machinist" on January 6, 1944, pp. 105–114.